Feb. 27, 1923.
C. E. WENNEN
DRILL BIT
Filed May 27, 1922
1,446,677
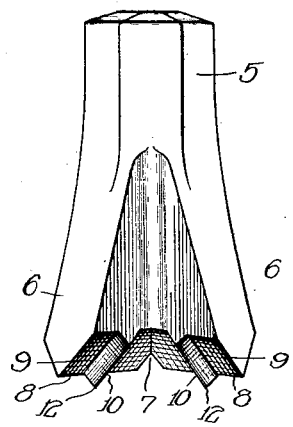
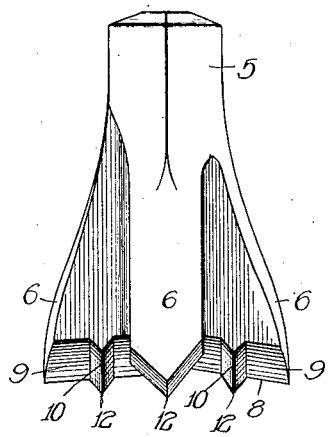
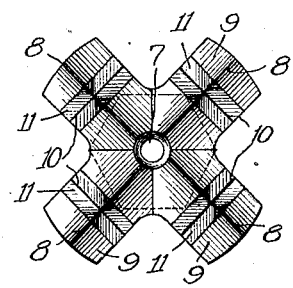
Witness:
G. Burkhardt
Inventor:
Charles E. Wennen,
By L. Anthony Usina
Attys.

Patented Feb. 27, 1923.

1,446,677

UNITED STATES PATENT OFFICE.

CHARLES E. WENNEN, OF VIRGINIA, MINNESOTA.

DRILL BIT.

Application filed May 27, 1922. Serial No. 564,201.

*To all whom it may concern:*

Be it known that I, CHARLES E. WENNEN, a citizen of the United States, residing at Virginia, in the county of St. Louis and State of Minnesota, have invented certain new and useful Improvements in Drill Bits, of which the following is a specification.

This invention relates to a new and improved drill bit and more particularly to a formation of the cutting face of a bit adapted for drilling rock or the like.

In the use of drills of this character, particularly in drilling hard rock, the outer edges or ends of the cutting edges of the drill face are rapidly worn or broken away. The drills are turned in use and the outer edges thus have to perform a greater amount of cutting since they cut away the outer circumference of the hole which is circular in cross-section. The wearing away or dulling of this portion of the bit requires the resharpening of the entire bit with consequent expense and furthermore with a large amount of lost time due to delay in removing and replacing bits.

It is an object of the present invention to provide a drill bit having a face so constructed as to facilitate the cutting action of the outer portion of the cutting edges.

It is a further object to provide a bit of this character which is simple in design and which may be readily formed from existing bits without the use of special tools.

Other and further objects will appear as the description proceeds.

Broadly, my invention comprises a drill bit having cutting edges and having secondary cutting points or edges extending transversely of the first mentioned cutting edges and extending axially beyond them. In the preferable form, the secondary cutting edges are spaced inwardly a short distance from the outer edge of the drill face. Since these secondary cutting edges extend in advance of the main cutting edges, they serve to form a circumferentially extending groove in the working face of the drill hole leaving a shoulder around the outer edge of the face. The outer portions of the primary cutting edges then work to break down this shoulder. It has been found in practice that the breaking down of this shoulder may be accomplished by the outer edges with greater speed and with less wear on the bit than is the case with bits not provided with my secondary cutting edge. It is to be understood that the secondary cutting edges are continually forming a groove in advance of the shoulder at the same time that the outer portions of the primary cutting edges are working down the shoulder.

I have illustrated a preferred embodiment of my invention in the accompanying drawings, in which—

Figure 1 is a side elevation of one form of my device;

Figure 2 is a view similar to Figure 1, the bit having been turned through an angle of 45°; and Figure 3 is a face view of the cutting face of the bit.

As shown in the drawings, the bit comprises the hexagonal shank 5 adapted to be secured to the drill and the cruciform cutting portion 6. As best shown in Figure 3, the drill is provided with a central opening 7 and with primary cutting edges 8 which do not extend fully to the center of the face. The primary cutting edges 8 are formed by the meeting of the beveled surfaces 9. The secondary cutting edges 10 extend axially beyond the beveled faces 9 and beyond the primary cutting edges 8. These secondary edges 10 are formed by the meeting of beveled surfaces 11, which are materially less in extent than the beveled surfaces 9 and which extend transversely of the surfaces 9. Each pair of cutting edges 10 serves to form a cutting point 12 on the line of the main cutting edge 8.

In the use of the drill, since it is rotated slightly between successive blows, the points 12 and the adjacent portions of the secondary cutting edges 10 will serve to cut a groove in the working face of the material. This groove will form an inner circular portion which will be broken down by the inner portion of the primary cutting edges. It will also form an outer circumferential shoulder which will be broken down by the outer portions of the primary cutting edges. Due to the cutting of this groove by the secondary cutting edges and the formation of this outer shoulder, the work accomplished by the outer portions of the main cutting edges is greatly facilitated and the wear on these portions of the edges is minimized. This results in a greater speed of drilling and also in a greater penetration before the bit is dulled.

I claim:

1. A drill bit having cutting edges thereon, and secondary cutting edges extending transversely of said first mentioned cutting edges, and axially beyond said edges.

2. A drill bit having portions beveled to form cutting edges and secondary cutting edges extending transversely across said beveled portions and first mentioned cutting edges, said secondary edge-forming portions being V-shaped in both longitudinal and transverse section.

3. A drill bit having radially extending cutting edges each formed by intersecting beveled faces, and secondary cutting edges extending transversely of said beveled faces and first mentioned cutting edges.

4. A drill bit having radially extending cutting edges each formed by intersecting beveled faces, and secondary cutting edges extending transversely of said beveled faces and first mentioned cutting edges, said secondary edges extending in planes substantially parallel to said beveled faces.

5. A drill bit having portions beveled to form cutting edges and secondary cutting edges extending transversely across said beveled portions and first mentioned cutting edges at points spaced from the outer edges of the drill face.

6. A drill bit having portions beveled to form cutting edges and secondary cutting edges extending transversely across said beveled portions and first mentioned cutting edges, said secondary edge-forming portions being V-shaped in both longitudinal and transverse section and being materially smaller in size than the beveled portions.

Signed at Duluth, Minnesota, this 16th day of May, 1922.

CHARLES E. WENNEN.